July 14, 1931.     R. W. BAILEY     1,814,781
INTERNAL COMBUSTION ENGINE
Filed May 3, 1928     4 Sheets-Sheet 1

WITNESS
E. Lutz

INVENTOR
R. W. Bailey
BY a. B. Reavis
ATTORNEY

July 14, 1931.  R. W. BAILEY  1,814,781
INTERNAL COMBUSTION ENGINE
Filed May 3, 1928  4 Sheets-Sheet 2

WITNESS
E. Lutz

INVENTOR
R. W. Bailey
BY
A. B. Reavis
ATTORNEY

July 14, 1931. R. W. BAILEY 1,814,781
INTERNAL COMBUSTION ENGINE
Filed May 3, 1928 4 Sheets-Sheet 4

WITNESS
E. Lutz

INVENTOR
R.W.Bailey
BY
A. B. Reavis
ATTORNEY

Patented July 14, 1931

1,814,781

UNITED STATES PATENT OFFICE

RICHARD WILLIAM BAILEY, OF ALTRINCHAM, ENGLAND, ASSIGNOR, BY MESNE ASSIGNMENTS, TO ASSOCIATED ELECTRICAL INDUSTRIES, LTD., OF ENGLAND

INTERNAL COMBUSTION ENGINE

Application filed May 3, 1928, Serial No. 274,915, and in Great Britain May 4, 1927.

The present invention relates generally to internal combustion engines, by which term is included any power plant wherein fuel is burnt in a suitable atmosphere and work is done as a result of the expansion of the products of combustion. In all such plants high gas temperatures are attained by combustion and an appreciable amount of heat is transmitted to the walls or surfaces enclosing the gas. This transference of heat is in most cases undesirable and necessitates the employment of an artificial cooling system to maintain the walls or surfaces at a practicable working temperature and in some cases the heat so transferred and dissipated through the cooling system is lost to further employment. The object of the present invention is to reduce these disadvantages and to provide an improved method and means for maintaining the walls of the combustion chamber relatively cool and at the same time conserve the heat energy available in the combustion gases.

The invention consists broadly in protecting the whole or a portion of the surface of the containing wall of a combustion chamber against direct reception of the heat of combustion, by means of a screen or shell suitably supported by or near or formed integrally with the containing wall. Except for the limited area necessary for the support of such screen or shell from or against the containing wall or surface there is no contact between these parts but a space is formed therebetween which is placed in free communication with the combustion space proper by means of suitable perforations of the shell or otherwise as may be found convenient.

By this arrangement the screen or shell receives the whole or the greater part of the heat that would otherwise be transmitted direct to the containing wall, and the latter where so protected only receives the heat communicated by the shell, or such as is communicated thereto by the gas between the shell and the wall.

The various features of the invention, including a number of constructional forms in which the invention may be carried into practice are hereinafter described with reference to the accompanying drawings illustrating same, wherein Figs. 1 and 2 show the invention applied to a cylinder and piston according to one construction, Fig. 1 being a sectional elevation corresponding to line I—I of Fig. 2, and Fig. 2 being a sectional plan corresponding to line II—II of Fig. 1;

Figure 17:
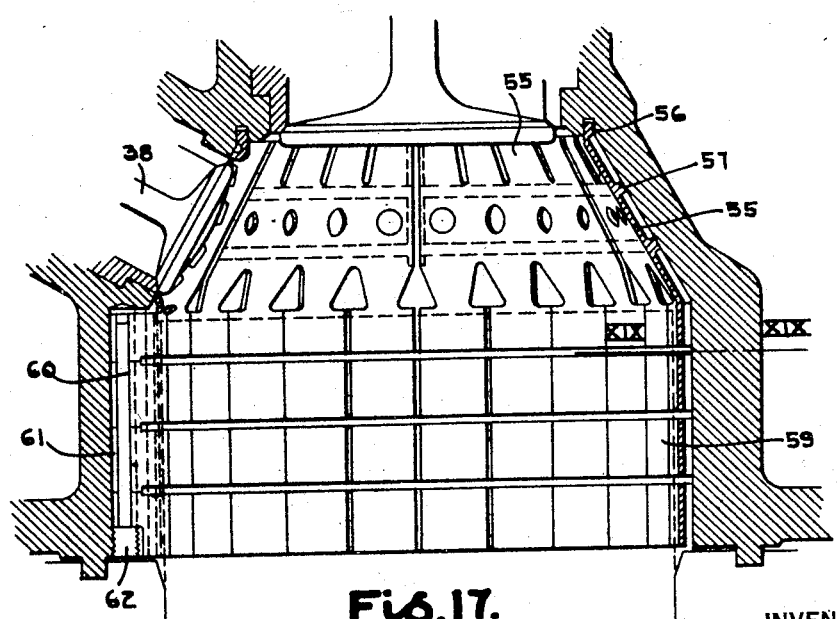
Figs. 17 and 18 are sectional elevations showing further modified constructions according to the invention.
Figure 19:
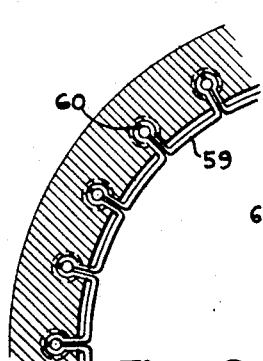

Fig. 19 corresponds substantially to a cross-section on line XIX—XIX of Fig. 17; and, Figs. 20 to 24 show details of further modifications.

Figures 1, 2:
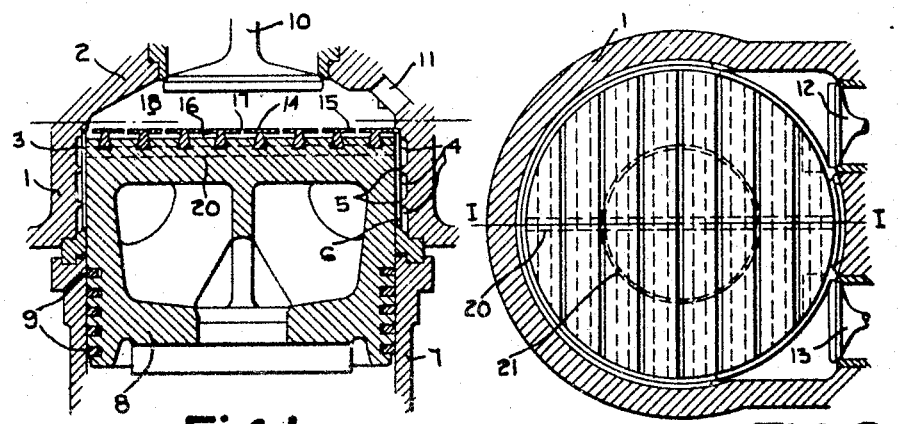

According to the constructions shown in Figs. 1 and 2, which represent a piston and a portion of a cylinder suitable for Diesel or similar engine, the side wall 1 of the cylinder cover portion 2, which is made detachable for convenience of construction, is shaped to receive a cylindrical shell 3 extending over the whole or a considerable part of the cylinder wall uncovered by the piston during the portion of the stroke in which combustion normally occurs.

Figure 3:
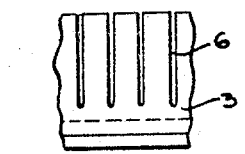
Fig. 3 is a detail view showing a portion of the shell employed to screen the cylinder wall in Fig. 1.

The wall 1 is formed with annular recesses 4 behind the shell 3, ribs 5 projecting between said recesses and providing an abutment against which the outer circumferential surface of the shell may rest. The shell is formed with a number of slots 6, as indicated more clearly by the fragment shown in Fig. 3, and is clamped at one end in a groove between the cover portion 2 and the barrel portion 7 of the cylinder. The internal diameter of the shell 3 is such as just to clear the sides of the piston 8, which when at the top of the stroke extends within said shell, rubbing contact of the piston with the walls of the cylinder occurring only between the lower barrel portion of the cylinder and the lower portion of the piston carrying the piston rings 9.

In the construction shown, the cylinder portion 2 carries an overhead exhaust valve 10, fuel injecting device 11 and lateral air inlet valves 12, 13, for which latter the shell 3 is suitably interrupted. The particular arrangement of the valves is immaterial to the present invention.

The top surface of the piston is also provided with a shield or screen comprising strips 14 of T-shaped cross section and the webs of the T-pieces are dovetailed into grooves formed in the piston, as shown most clearly in Fig. 1. The flange portions 15 of the strips extend parallel and close to the surface of the piston so as to leave narrow spaces or pockets 16 therebetween, the narrow passages 17 left between the flanges of adjacent strips affording communication between the spaces 15 and the interior of the combustion chamber 18.

With such a construction, during the compression stroke of the piston 8, a charge of relatively cool gas previously admitted to the cylinder is compressed, some of said gas being forced through slots 6 and 17 into the pockets or recesses 4, 16 behind the shell 3 and the flanges 15 of strips 14 respectively. Said shell and strips, which cover a substantial portion of the containing walls of the combustion chamber are therefore exposed to relatively cool gas on both sides. Upon the combustion or explosion of the compressed charge in the combustion space 18, and during the initial portion of the downward stroke of the piston, heat which would normally be transmitted directly to the walls of the combustion chamber is taken up by the shell 3 and flanges 15. During the expansion of the burnt gases which immediately follows, the gas in the pockets or recesses 4, 16, expands and part flows back through slots 6, 17 into the main combustion space, tending to carry with it heat from the shell or screen. The fall in pressure of said gas may be accompanied by a corresponding fall in temperature which further assists in cooling the screen and cylinder walls. Moreover the gas in the pockets or recesses forms in effect an insulating blanket between the shell or screen and the adjacent portions of the containing wall of the cylinder (including the top of piston 8) and heat can only be conducted to these portions relatively slowly through the small cross-sections of metal presented by the webs of strips 14 and the ribs 5 and other parts where the shell 3 touches the cylinder wall 1. The cooling action is continued by a fresh charge of air or other gas entering the cylinder during the subsequent scavenging and/or suction periods of the cycle and the events described above are repeated.

It will be readily appreciated from the foregoing that by measures such as described above the transfer to the containing walls of the cylinder of heat developed throughout the combustion cycle may be greatly restricted. Since a very large proportion of the heat normally imparted to the cylinder walls and carried away by the circulating water or air is given up to the walls in the region of the upper third of the cylinder barrel and to the cylinder and piston heads, it will be apparent that the invention may lead to a considerable decrease in heat losses, this being particularly advantageous in power plant wherein special provision is made for the efficient utilization of the heat energy available to the gases, as for example in plant such as referred to in the specifications of Letters Patent Nos. 232,278, 244,215 and 245,541.

Water cooling of the cylinder walls may be rendered unnecessary, or water cooling may be retained and the maximum temperatures obtaining in the combustion chamber may be increased to the limit at which the shell 3, screen members 14, or the cylinder head and valves are liable to deterioration, these parts being preferably made of materials having particularly high heat resisting properties such as for example alloys of nickel and chromium or iron with various additions of nickel, chromium or tungsten.

In cases where high working temperatures are aimed at it may be advantageous to provide screen devices also for the cylinder head and valves and certain ways in which this may be done are hereinafter rendered apparent.

Figure 4:
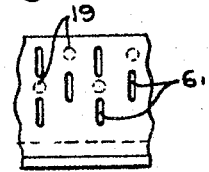
Fig. 4 is a detail view showing an alternative form which such shell may take.
Figure 10:
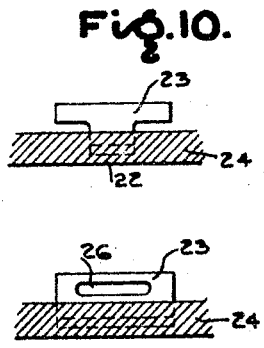
Figs. 8 to 11 show details to a somewhat enlarged scale.

It may be noted with respect to Figs. 1 and 2 that the shell 3 and its screen members 14 are arranged so as to permit of expansion or contraction due to temperature variations. The shell 3 can expand or contract freely in the axial direction, as it is clamped at one end only, and the slots 6 therein impart sufficient elasticity to accommodate distortion due to differential expansion of the shell and wall 1. Instead of providing ribs 5 upon the cylinder wall to support the shell 3, ribs or other projections such as bosses 19 (Fig. 4) may be formed on the shell for this purpose. Fig. 4 also shows an alternative arrangement of slots in the shell member $6_1$.

The strips 14 are preferably slidably fitted in the dovetail slots of the piston 8 but are rigidly held near the centre, for example by means of a transverse locking pin 20 (indicated by dotted lines in Figs. 1 and 2) or otherwise in any convenient manner permitting longitudinal expansion of said strips.

If desired, a portion of the cylinder head may be left unprotected by a screen, for example that portion within the circle indicated by dotted lines 21 in Fig. 2. Such portion of the cylinder head will be preferably raised to or above the level of the top of the strips 14 which cover the remainder of the surface and would of course be highly heated, as in a normal engine.

Further convenient constructions which may be employed for screening the piston head are shown in Figs. 5–11 and the application of these or similar constructions to the whole of the upper part of the cylinder are illustrated in Figs. 12, 13, 15 and 17.

Figure 6:
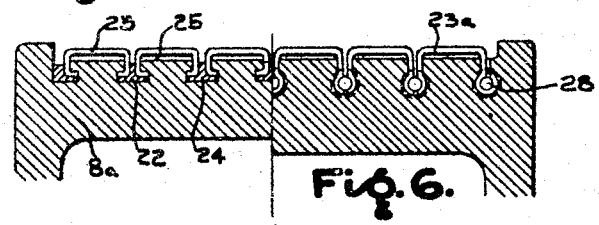
Figs. 5, 6 and 7 are respectively a plan and sections on lines VI—VI and VII—VII of Fig. 5 showing constructions according to the invention applied to the top of a piston, the right-hand half of each figure illustrating one construction and the left-hand half another.
Figure 7:
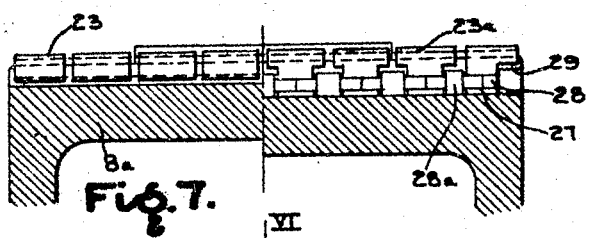
Figure 5:
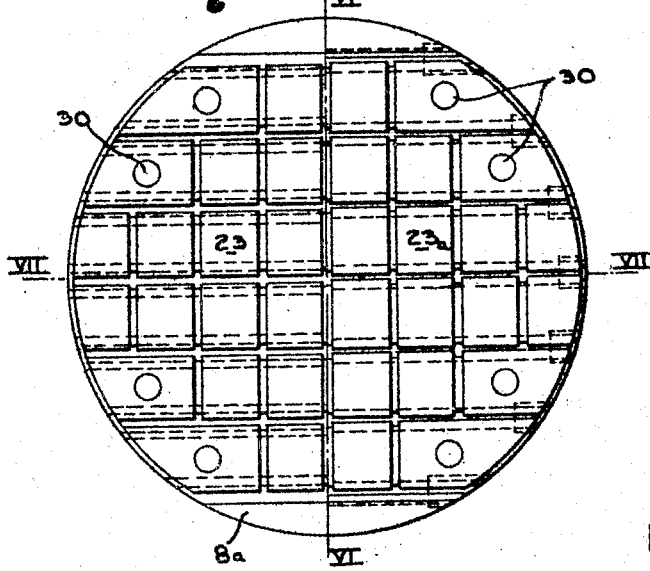

In the construction shown by the left-hand portion of Figs. 5–7 the piston 8$a$ is formed with T-shaped grooves 22 and a number of plates 23 of substantially C-shaped cross section are provided, adapted to engage the shoulder portions of adjacent grooves 22, as shown most clearly in Fig. 6, a space 25 being left between the body portion of each plate 23 and the surface of the piston. In mounting the plates 23 the inturned ends thereof are inserted in the appropriate grooves 22 at one end and the plates are slid along into the desired position in which they are then secured by the insertion of caulking pieces 24. The latter are preferably caulked so as to engage the plates 23 firmly over a relatively small area only, thereby permitting ready expansion of said plates when necessary.

Figure 11:
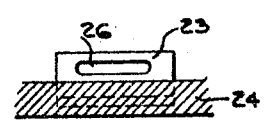
Figure 8:
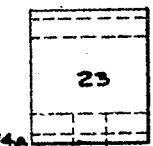
Figure 9:
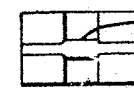

If desired, a single caulking strip may serve to secure a plurality of plates in each groove, but preferably short pieces are employed, for example, as shown in Fig. 8 or Fig. 9. In Fig. 8, which represents a plan view of two adjacent plates 23, a small T-shaped caulking piece 24$a$ is located centrally between the plates and caulked in position. Fig. 9 represents a plan of a modified caulking piece, the cross section of which is somewhat thickened at the medial portion 24$b$ so as to afford a driving fit with the plates 23 when inserted in position. Alternatively or in addition the plates 23 may be cut away at the parts which enter the grooves 22, as indicated by the side elevation, Fig. 10, such construction permitting ready expansion of the plates longitudinally and also serving to limit still further the cross section of metal through which heat may be conducted into the wall carrying said plates. For the latter purpose the plates may alternatively be formed with apertures such as 26 as shown in Fig. 11. Instead of being plane as shown, the screening surfaces of the plates 23 may be concave or convex as desired.

In the modified construction illustrated by the right-hand side of Figs. 5–7 grooves 27 the bottom portions of which are of cylindrical form are formed in the top of the piston to receive the correspondingly shaped limbs of plates 23$a$ which when in position are locked by the insertion of cylindrical locking pins 28. If desired, plain pins may be employed for this purpose, but in the construction shown the pins have enlarged portions 28$a$ (Fig. 7) which fit the sides of grooves 27, while the two end portions of said pins engage the limbs of adjacent plates 23$a$. By this arrangement forces acting upon the plates 23$a$ may be transmitted to the piston through the intermediary of pins 28 instead of directly through the extremities of the plates, which would be more liable to lead to wear and slackness of the parts. If desired the cylindrical portions of grooves 27 may be provided with tubular linings of hard steel. The locking pins are retained in position by the aid of plugs 29 screwed into the piston head.

It will be apparent that by constructions such as shown in Figs. 5–7 a piston may be readily provided with a screen or shield adapted to serve in a similar manner to that previously described above with reference to Figs. 1 and 2. The plates forming the screen may be of a similar size, with the exception of those adjacent the sides of the piston which must be of special form. The plates may be provided with additional apertures such as 30 (Fig. 5) to permit the gas to flow over the upper and lower surfaces thereof in the desired manner. If desired, a number of plates such as 23$a$ could be formed integrally by suitably bending a single strip so as to extend within a plurality of grooves 27 and receive locking pins 28.

Figure 12:
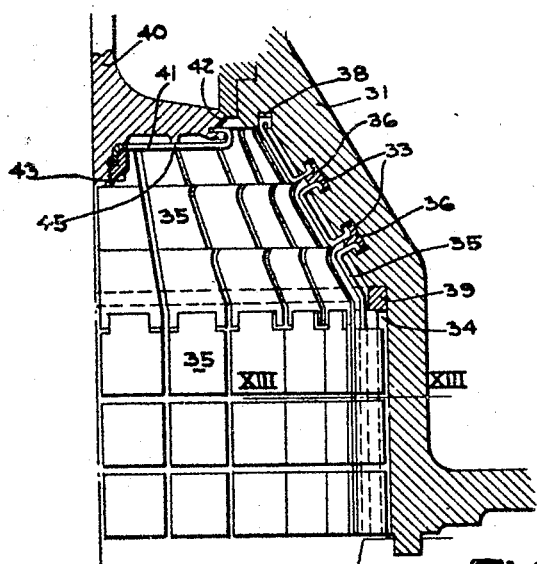
Fig. 12 shows a portion of a cylinder and valve according to further modification.
Figure 13:
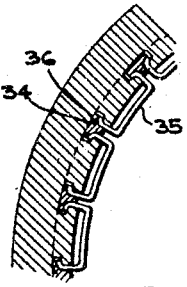
Fig. 13 represents a section on line XIII—XIII of Fig. 12.
Figure 14:
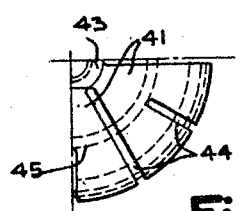
Fig. 14 is an inverted plan view of the valve head portion shown in Fig. 12.

Similar constructions may be employed for screening the side walls and head of the combustion chamber. For example, as shown in Figs. 12 and 13 the cylinder head or cover portion 31 may be tapered somewhat towards a central exhaust valve 40 and formed with annular grooves 33, while the parallel cylindrical portion is formed with grooves 34 parallel to the longitudinal axis of the cylinder. The grooves 33, 34 are similar to grooves 22 (Fig. 6) and adapted to receive plates 35 and caulking pieces 36 of a similar construction to those previously described with reference to the left-hand side of Figs. 5–7. The plates 35 for screening the tapered or conical portion of the cylinder head may be inserted in position by passing them through the inlet port which is not shown in Fig. 12 but is similarly diposed to the inlet port 37 shown in Fig. 15. The upper ring of plates 35 is shaped to engage a groove 38 formed in the cylinder head, while the ring of plates at the bottom of the conical portion rest with their lower ends against a ring 39 on the inside and against the backs of the upper ends of the first row of plates 35 shielding the cylindrical portion. The last mentioned plates are inserted endwise into the appropriate slots 34 and slid into position in the longitudinal direction of the cylinder. The caulking pieces are inserted at the same time as the corresponding plates 35 and the latter are finally firmly secured in position by caulking.

Fig. 12 also shows an arrangement for screening the head of the valve 32, namely, by a provision of a suitable number of sector-shaped plates 41 which at their outer peripheries engage a groove 42 formed in the valve head and at their inner peripheries are engaged by a cap 43 screwed upon the valve. The plates 41 are formed with suitable slots 44 and are supported intermediately by a rib or abutment 45. The protective action of the screening members 41 and 35 is similar to that of the screen 3 and members 14 previously described.

Figure 15:
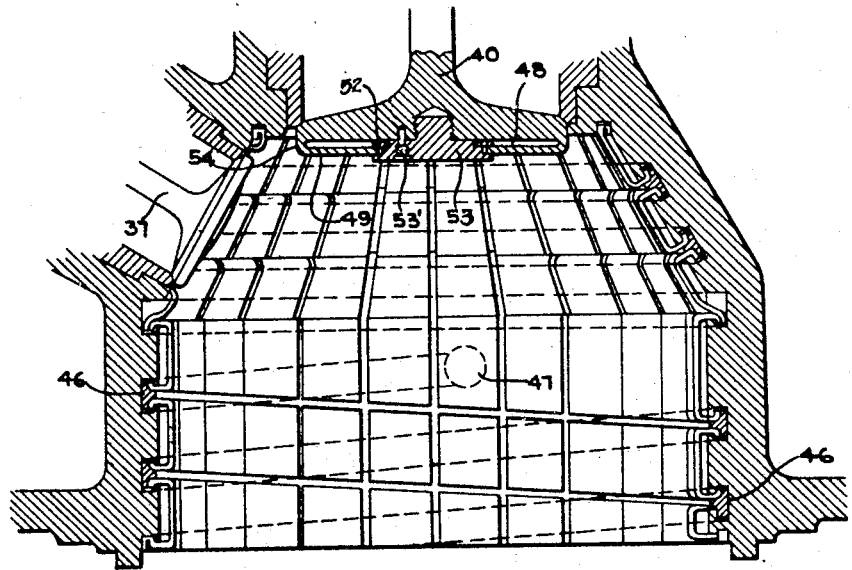
Fig. 15 is a sectional elevation showing the invention applied to a cylinder and valve according to a further modified construction.
Figure 16:
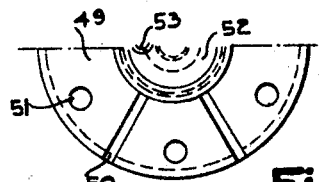
Fig. 16 is an inverted plan view of the valve head shown in Fig. 15.

Fig. 15 shows a further modified construction wherein T-shaped grooves are formed in the cylinder walls to receive the plates comprising the screen. In this construction the conical portion of the cylinder head is lined with plates in a similar manner to that described above with reference to Fig. 12, while the parallel portion of the cylinder wall is formed with a helical groove 46 of T-shaped cross section, along which the correspondingly shaped plates for screening said wall and the appropriate caulking pieces are threaded. The continuation of the grooves 46 on the opposite portion of the cylinder wall to that shown is illustrated by dotted lines, said groove terminating in a recess 47 over which a screen plate of convenient form may be affixed.

Fig. 15 also shows an alternative method of screening the exhaust valve 40 disposed in the top of the cylinder, which construction may moreover be readily applied to the inlet valve 37 if desired. The valve head 40 is bored centrally and formed with an internal groove 48 extending over the major portion of said valve head so as to leave a thin plate-like portion 49 adapted to serve as a screen for the valve. The portion 49 is provided with slots 50 and may also be formed with perforations 51, and beneath the inner ends of the sector-shaped portions which remain between slots 50 is inserted a washer 52, said ends being then lightly clamped upon said washer by means of a plug 53 screwed in to the valve. The plug 53 is prevented from rotating by means of a pin 53′ passing into the valve 40 and screwed and riveted into said plug whereby the construction is rendered rigid. It is evident that the body of the valve 40 will be screened to a considerable extent by the portions 49, heat being conducted into said valve only through the plug 53 and washer 52 and the restricted marginal portions 54, where the portions 49 join the body portion of valve 40.

A further modified construction is shown in Figs. 17 and 19 where a method of assembly similar to that shown on the right-hand side of Figs. 5–7 is employed. In this construction the conical portion of the cylinder head is lined with a plurality of shell members 55 which are engaged at their upper ends in an annular groove 56 formed in the cylinder head, and are provided with ribs 57 adapted to rest against the cylinder wall. The shell member 55, adjacent the inlet valve 38, is suitably apertured and formed so as not to interfere with the action of said valve. The cylindrical portions of the walls of the cylinder head portion shown are lined with screen members 59 which are secured by pins 60 in grooves 61 formed in said walls parallel to the longitudinal axis of the cylinder, said pins being retained in position by screw plugs 62. The construction is rendered rigid by welding the lower edges of the conical shell portions 55 to the upper edges of the upper row of screen members 59. The screen or shell serves to protect the wall of the cylinder in a substantially similar manner to those previously described, and it may be noted that the ribs 57 not only serve to support the shell 55 intermediately but also prevent the flow of gas behind the screen from one zone of the cylinder to another.

It will be apparent that the heads of the pistons employed with cylinders having cover portions of the forms shown in Figs. 12, 15 or 17 may be suitably shaped to afford the desired clearance volume at the end of the compression stroke and may be screened by means such as described above or in any other convenient manner.

Figure 18:
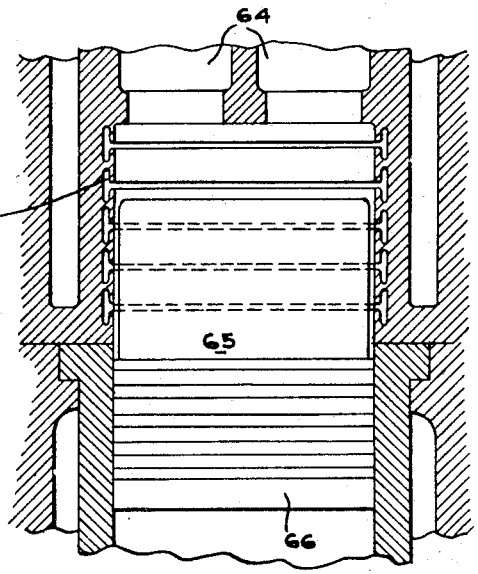

Fig. 18 shows a construction in which the cylinder walls are screened by members 63 formed integral with said wall. In this construction overhead valve ports 64 are shown disposed in the upper wall of the cylinder, and the upper portion 65 of the piston 66 is formed of somewhat reduced diameter so as to extend within the combustion space surrounded by screen members 63 without making rubbing contact therewith.

Figure 20:
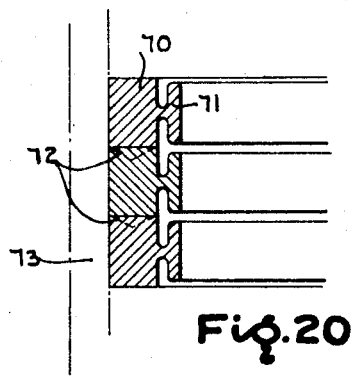
Figure 21:
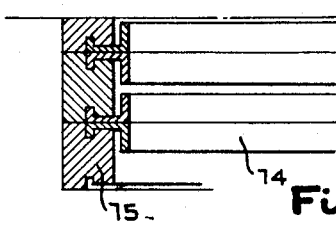

Further constructions for screening the walls of the combustion chamber are shown in Figs. 20 and 21. In Fig. 20 a number of rings 70 having integral T-shaped projections 71 are placed together and suitably clamped in axial alignment. If desired the contiguous surfaces of the rings may be shaped so as to interfit, for example as indicated by dotted lines 72. The rings 70 may themselves constitute the gas-tight cylinder wall when clamped together or may be contained within an outer wall 73. Fig. 21 illustrates a somewhat similar construction wherein the screen portions 74 are formed separately and appropriately secured in grooves in the ring members 75, the latter being clamped together. The members 71, 75, which constitute the protective screen for the cylinder wall afford a relatively small cross-section at the web portions thereof for the conduction of heat to said wall and this cross may be further reduced if desired by the provision of apertures in said web portions.

Figure 22:
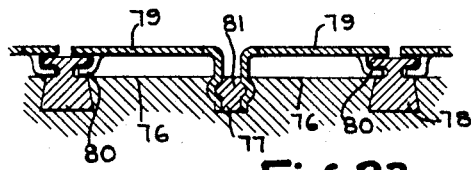
Figure 23:
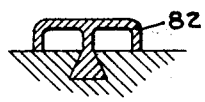
Figure 24:
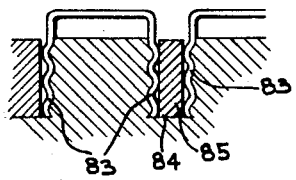

Three further modified forms in which the invention may be applied are indicated by way of example in Figs. 22, 23 and 24. In Fig. 22 a construction is shown which does not necessitate endwise insertion of the screen plates. The surface 76 to be protected is provided with grooves 77 and inset pieces 78 secured in any suitable manner. Screen plates 79 having the form shown are inserted with their downwardly bent tongues 80 beneath the shoulders of the inset pieces 78 the other ends of said plates entering the grooves 77. When two adjacent plates have been thus placed in position a caulking piece 81 is applied between their ends in the groove 77 and caulked securely in position as shown. With this arrangement the screen plates are free to expand or contract laterally, and if desired the inset pieces 78 may be hardened to withstand any wear occasioned by movement of the tongues 80. The plates 79 may be provided with such apertures as may be desirable.

Fig. 23 shows a screen member 82 substantially similar to strips 14 shown in Fig. 1, but having the marginal edges turned down to afford additional support. The member 82 would be suitably apertured.

Fig. 24 shows a simple construction in which the depending side portions 83, of the screen member are corrugated and engage correspondingly corrugated grooves 84. A caulking piece 85 is inserted between the sides of the screen members and the latter secured firmly in position by caulking.

If desired, the walls of the cylinder or other parts may be lagged with insulating material in addition to being screened as above described, for example by oxidizing the surfaces thereof. Insulating material may be inserted at the joints between the screened portions of the cylinder and the unscreened portions thereof. In order to prevent air or gaseous mixture taking up too much heat from a screen on its entry to the combustion chamber during the induction stroke or to prevent a mixture passing behind the screen such as would be liable to cause combustion or explosions to occur in the recesses or pockets, each incoming charge may be guided by the valve or by baffles as may be found desirable.

Also if, for any reason, conditions should exist such that the mean temperature of the gas in any pocket behind a screen is greater than the mean temperature of the adjacent surface of the screen, such surface may be serrated or roughened so that the screen tends to take up heat from the gas in the pocket more readily than the adjacent portions of the cylinder wall or other part in which the pocket is formed.

Moreover, while in the above description the screening of the portion of the cylinder adjacent the head has been particularly referred to, it will be evident that the invention may be applied to the medial portion of the cylinder barrel in the case of an engine of the opposed piston type.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an internal combustion engine, the combination of a combustion chamber having a solid interior surface, a thin metallic plate structure disposed closely adjacent to and parallel with said combustion surface, and means for supporting the plate structure from the surface of the combustion chamber and providing for minimum heat conduction between the combustion chamber surface and the plate structure, said plate structure having a plurality of openings distributed thereover so as to afford free circulation of gas between the combustion chamber on the one side of the plate structure and the space intervening between the other side of the plate structure and the adjacent surface of the combustion chamber.

2. An internal combustion engine as claimed in claim 1 wherein the plate structure supporting means is formed to afford linear expansion and contraction of the plate member relative to its supporting surface.

3. In an internal combustion engine, the combination of a cylinder having a head portion and a piston reciprocable within the cylinder toward and away from the head portion, said cylinder having a wall surface forming with the head surface of the piston a combustion chamber, a thin metallic plate structure disposed closely adjacent to and parallel with the combustion chamber wall surface of the cylinder, and means for supporting the plate structure from the combustion chamber wall surface of the cylinder and providing for minimum heat conduction between the plate structure and its supporting surface, said plate structure having a plurality of openings distributed thereover so as to afford free circulation of gas between the combustion chamber on the one side of the plate structure and the space intervening between the other side of the plate structure and its supporting surface.

4. In an internal combustion engine, the combination of a cylinder having a head portion and a piston reciprocable within the cylinder toward and away from the head portion and defining therewith a combustion chamber, a thin metallic plate structure disposed closely adjacent to and parallel with the circular head surface of the piston, and means for supporting the plate structure from the head surface of the piston and providing for minimum heat conduction between the plate structure and its supporting surface, said plate structure having a plurality of openings distributed thereover so as to afford free circulation of gas between the combustion chamber on the one side of the plate structure and the space intervening between the other side of the plate structure and the adjacent supporting surface.

5. In an internal combustion engine, the combination of a cylinder having a head portion and a piston reciprocable within the cylinder toward and away from the head portion and defining therewith a combustion chamber having an interior, cylindrical wall surface, a thin metallic plate structure disposed closely adjacent to and parallel with the cylindrical wall surface of the combustion chamber, a second thin metallic plate structure disposed closely adjacent to and parallel with the circular head surface of the piston, and means for supporting the plate structures, respectively, from the cylindrical wall surface of the combustion chamber and from the circular head surface of the piston, said supporting means providing for minimum heat conduction between the plate structures and their supporting surfaces and said plate structures having a plurality of openings distributed thereover so as to afford free circulation of gas between the combustion chamber on the one side of plate structures and the spaces intervening between the other side of the plate structures and their adjacent supporting surfaces.

6. An engine as claimed in claim 5 wherein the plate structure supporting means are formed to provide linear expansion of the respective plate members relative to their supporting surfaces.

7. In an internal combustion engine, the the combination of a cylinder having a head portion and a piston reciprocable within the cylinder toward and away from the head portion and defining therewith a combustion chamber having an interior, cylindrical wall surface, a thin metallic plate structure disposed closely adjacent to and parallel with the cylindrical wall surface of the combustion chamber, a cylindrical head portion provided on the piston and movable into and out of said plate structure, a second thin metallic plate structure disposed closely adjacent to and parallel with the circular end surface of the head portion of the piston, and means for supporting the plate structures, respectively, from the cylindrical wall surface of the combustion chamber and from the circular end surface of the head portion of the piston, said supporting means providing for minimum heat conduction between the plate structures and their supporting surfaces and said plate structures having a plurality of openings distributed thereover so as to afford free circulation of gas between the combustion chamber on the one side of the plate structures and the spaces intervening between the other side of the plate structures and their adjacent supporting surfaces.

In testimony whereof, I have hereunto subscribed my name this 23rd day of April, 1928.

RICHARD WILLIAM BAILEY.